US012268935B2

(12) United States Patent
    Dahlstedt

(10) Patent No.: US 12,268,935 B2
(45) Date of Patent: Apr. 8, 2025

(54) STICK PATTERNS IN A SPORTING EVENT

(71) Applicant: Drive Hockey Analytics, Coquitlam (CA)

(72) Inventor: Mike Dahlstedt, Coquitlam (CA)

( * ) Notice: Subject to any disclaimer, the term of this patent is extended or adjusted under 35 U.S.C. 154(b) by 0 days.

(21) Appl. No.: 18/599,171

(22) Filed: Mar. 7, 2024

(65) Prior Publication Data
    US 2024/0207681 A1    Jun. 27, 2024

Related U.S. Application Data

(63) Continuation of application No. 17/066,365, filed on Oct. 8, 2020, now Pat. No. 11,998,803.

(30) Foreign Application Priority Data
    Oct. 8, 2019    (CA) ................................ CA 3055343

(51) Int. Cl.
    *A63B 24/00*    (2006.01)
    *G06V 20/40*    (2022.01)
    *G06V 40/20*    (2022.01)
(52) U.S. Cl.
    CPC .......... *A63B 24/0062* (2013.01); *G06V 20/42* (2022.01); *G06V 40/23* (2022.01); *A63B 2225/50* (2013.01)

(58) Field of Classification Search
    CPC ................. A63B 24/0062; A63B 2225/50; G06V 20/42; G06V 40/23
    See application file for complete search history.

(56) References Cited

U.S. PATENT DOCUMENTS

| 2010/0030350 | A1* | 2/2010 | House | G06V 20/40 700/91 |
| 2016/0092769 | A1* | 3/2016 | Lucey | G06N 7/01 706/47 |
| 2018/0311561 | A1* | 11/2018 | Puzhevich | G06V 40/23 |
| 2019/0076710 | A1* | 3/2019 | Ding | A63B 60/46 |
| 2020/0324185 | A1* | 10/2020 | Hulkki | A63B 24/0021 |

* cited by examiner

*Primary Examiner* — Omkar A Deodhar
(74) *Attorney, Agent, or Firm* — Perpetual Motion Patents

(57) ABSTRACT

A system and method of tracking and classifying an athlete's stick techniques used during a sporting event are disclosed, which includes measuring detailed motions and position of at least one stick object being used in sports, producing relevant stick technique patterns and classifying those patterns in a relevant manner. Classified stick pattern data is used to improve the accuracy and clarity of sporting event metrics, the ability to quantify athlete's skill and the ability to develop athletes based on their game situation techniques. The method used allows for accurate, near real-time discovery of stick patterns during live sporting events without altering or impacting the game or an athlete's ability to perform.

9 Claims, 12 Drawing Sheets

*Figure 6*

600 - EXAMPLE SUBSET OF COLLECTED STICK TAG DATA

| DATA TIMESTAMP (602) | STICK ID (604) | STICK LOCATION (606) | STICK ORIENTATION (608) |
|---|---|---|---|
| 4680.053 | B864 | 2607  1491  -483 | -3 - 1I - 2J + 0K |
| 4680.153 | B864 | 2627  1413  -547 | -3 + 0I + 1J + 2K |
| 4680.271 | B864 | 2630  1411  -558 | -3 + 2I + 0J - 1K |
| 4680.353 | B864 | 2630  1411  -561 | -2 - 3I + 1J + 0K |
| 4680.453 | B864 | 2635  1401  -576 | -2 - 1I + 0J - 3K |
| 4680.571 | B864 | 2628  1405  -575 | -2 + 0I + 3J - 1K |
| 4680.703 | B864 | 2603  1404  -544 | -1 + 0I - 2J + 3K |
| 4680.757 | B864 | 2596  1401  -529 | -1 + 2I - 3J + 0K |
| 4680.855 | B864 | 2597  1403  -528 | -1 + 3I + 0J + 2K |
| 4680.951 | B864 | 2588  1416  -507 | 0 - 3I - 2J + 1K |

610 TIME DATA ALIGNMENT

612 - SET OF TRANSMITTED DATA

614 - QUARTERNION DATA FORMAT

626 - REFERENCE CALIBRATIONS

118 - EXAMPLE SUBSET OF PLAYER AND PUCK TRACKING DATA

| DATA TIMESTAMP (620) | GAME TIME (622) | EVENT (622) | POSSESSION | 422F LOCATION (624) |
|---|---|---|---|---|
| 23812.449 | 3:12 |  | 422F | 2504  1536  -320 |
| 23812.550 | 3:12 |  | 422F | 2483  1525  -295 |
| 23812.652 | 3:12 |  | 422F | 2495  1518  -323 |
| 23812.736 | 3:12 |  | 422F | 2527  1416  -409 |
| 23812.853 | 3:12 |  | 422F | 2550  1462  -422 |
| 23812.950 | 3:12 |  | 422F | 2569  1491  -434 |
| 23813.053 | 3:11 | SHOT | 422F | 2583  1525  -430 |
| 23813.152 | 3:11 |  |  | 2597  1552  -438 |

*Figure 8*
800 - SAMPLE CONTROL DATA ATTRIBUTES
| EVENT TYPE | APEX DEFINIITION | TIME FROM APEX | ORIENTATION METHOD |
|---|---|---|---|
| 802 | 804 | 806 | 808 |
|  |  |  |  |
810 - SAMPLE STICK PATTERN DEFINITION DATA
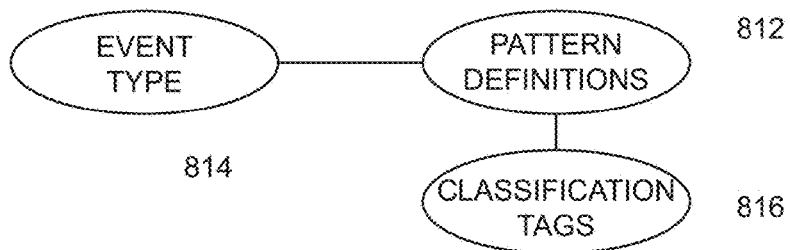
820 - SAMPLE STICK PATTERN DATA REPOSITORY
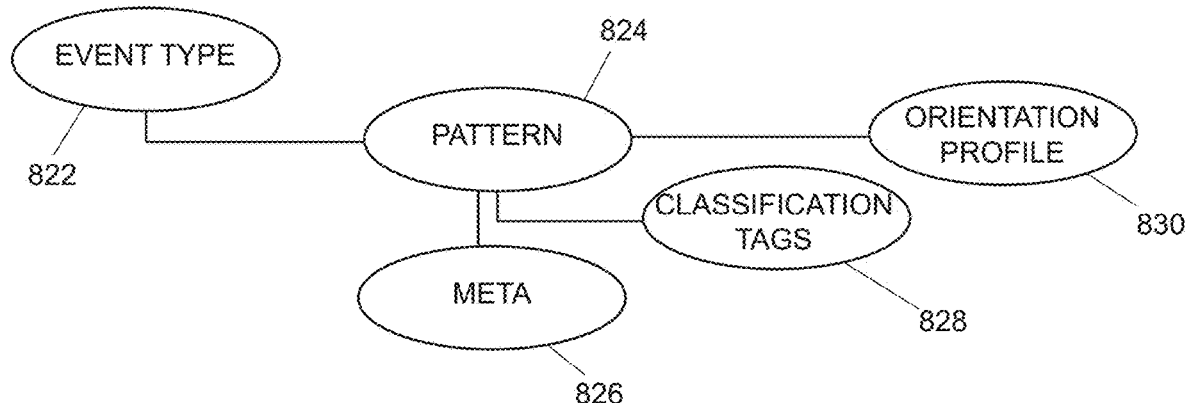

*Figure 9*
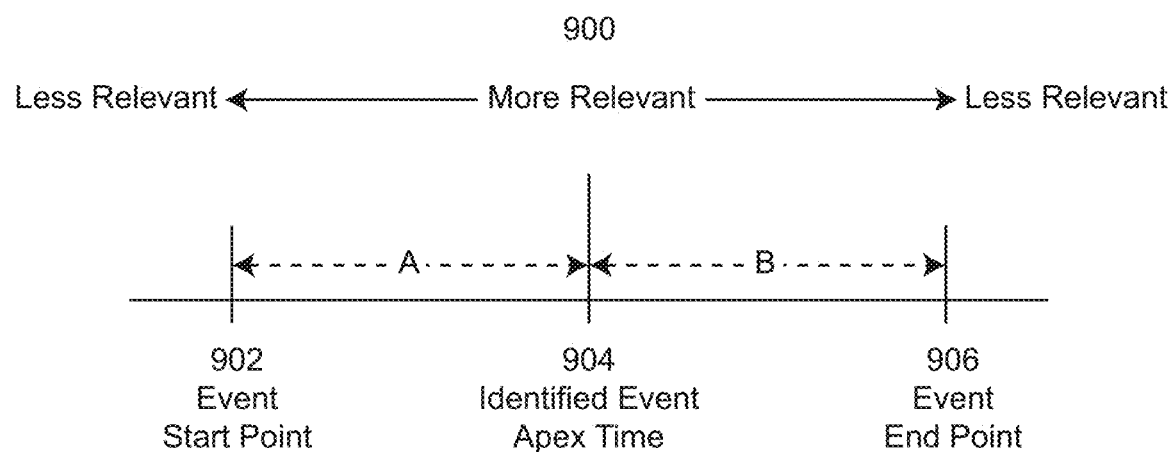
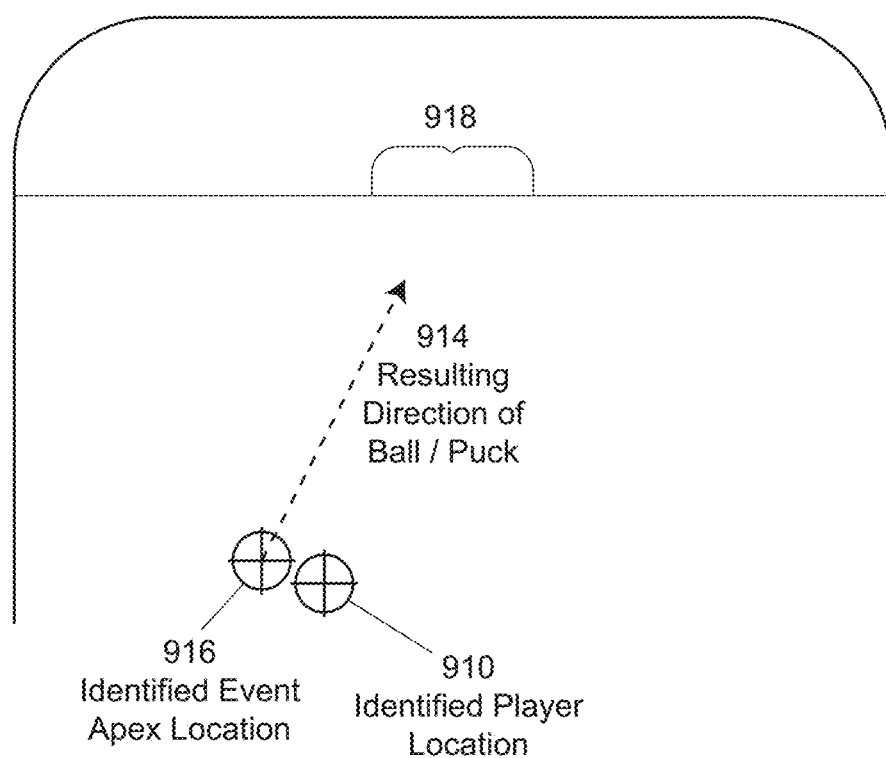

*Figure 12*
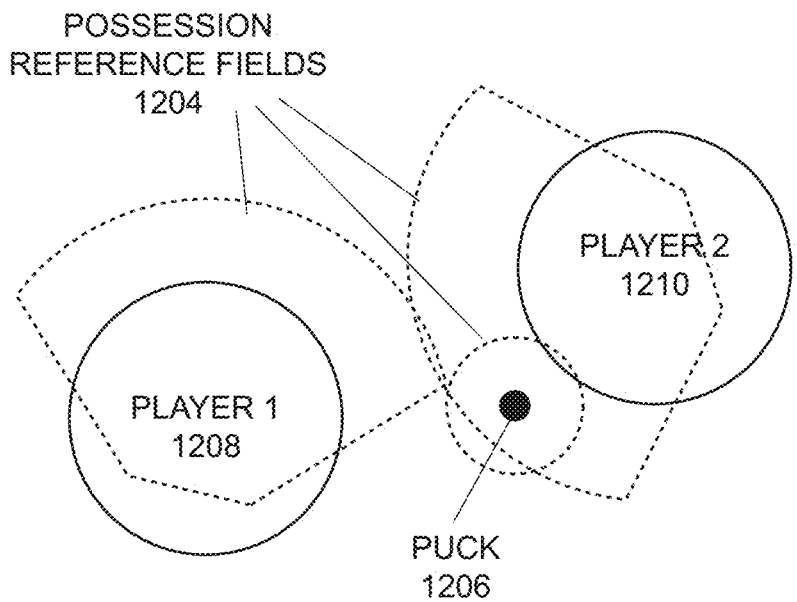
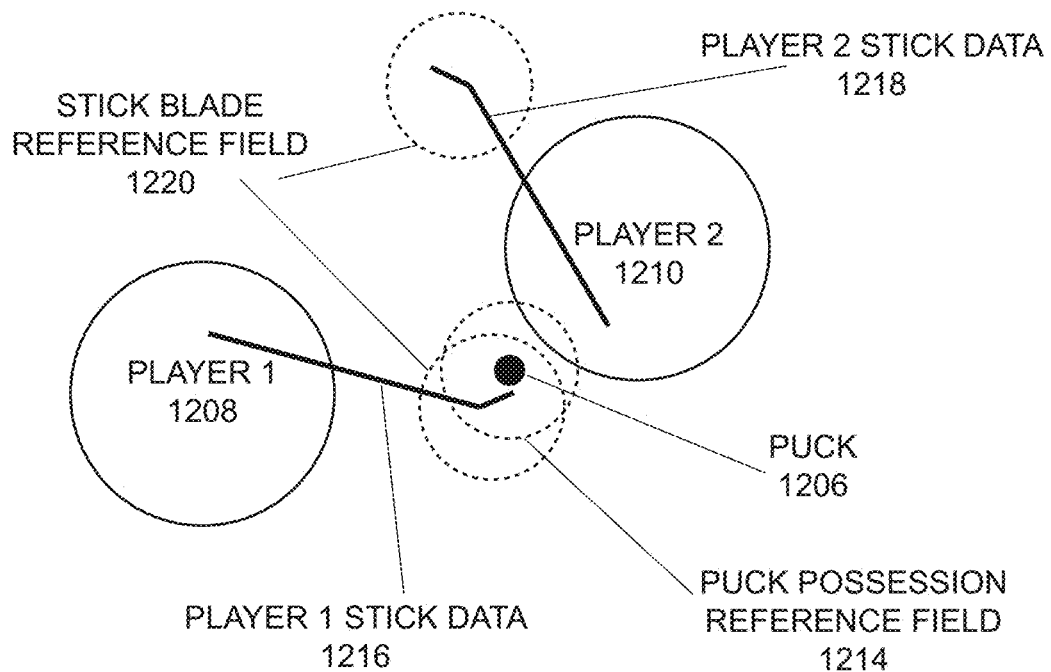

STICK PATTERNS IN A SPORTING EVENT

RELATED APPLICATION

This Application claims Priority from Canadian Patent Application CA3055343 filed 8 Oct. 2019. The Application is a Continuation of U.S. Ser. No. 17/066,365 filed Oct. 8, 2020.

FIELD OF THE INVENTION

The present invention relates to the use of wireless devices for identifying the stick techniques athlete's employ during game situations as related to team sports where a stick object is the primary device used by athletes, such as in hockey or lacrosse.

BACKGROUND

Over the past several years, the use of data in sports has risen in popularity as a means to make better evaluation, development and tactical decisions, as well as for purposes such as to enhance fan experience through deeper insights and gaming. As the usefulness of data continues to grow, there is a need to capture greater detailed insights and accuracy. For example, identifying what type of shot an athlete uses in key situations, and the technique of that shot can help better evaluate an athlete's shooting skill set and provide a means for that same athlete to develop a better technique with less reliance on expert trainers.

Particularly relevant to tracking sports data are systems that can identify key sport events such as possession. U.S. Pat. Nos. 9,025,021 82 and 8,477,046 provide different means of identifying statistics, such as possession, based on the location of the player, object and time. Although this can identify basic tactical data, it does not provide data around the stick techniques involved by individual players during the sporting events and therefore provides little basis to determine the skill of an athlete who is performing a technique, such as a shot or pass or check.

Some systems are available for measuring stick devices and correcting athlete performance. For example, specialty training rooms are equipped with devices to measure a player shooting technique in a controlled environment (e.g., video, accelerometer-based systems, RFID equipment, etc.). The data may be automatically generated and used by the trainer and athlete to adjust and improve their technique. A major disadvantage of such systems is that their use is confined to a single location in a controlled environment and would not be practical to evaluate every stick-based technique across all players during actual live sporting events.

The present invention may improve existing systems by capturing detailed stick patterns from players in the same sporting event and more accurately calculating statistics, which can improve the accuracy of other stats that are based around possession, such as controlled zone entries, turnovers and takeaways.

Having precise location, time, technique and orientation data of the stick provides a deeper, richer insight of the skill the athlete possesses rather than limiting to tactical insights that is collected from current sports tracking data systems.

BRIEF DESCRIPTION OF THE DRAWINGS

In the drawings, wherein similar reference characters denote similar elements throughout the several views:

FIG. 6 is an illustration of datastore architecture for stick tag data and player/puck data;

FIG. 8 is a relational data diagram of defined stick patterns for classification and skill metrics.

FIG. 9 is an illustration of event definitions for a time window and location data.

FIG. 12 is a visual representation of relative puck, player, and stick location for two players to determine possession.

SUMMARY OF THE INVENTION

Figure 1:
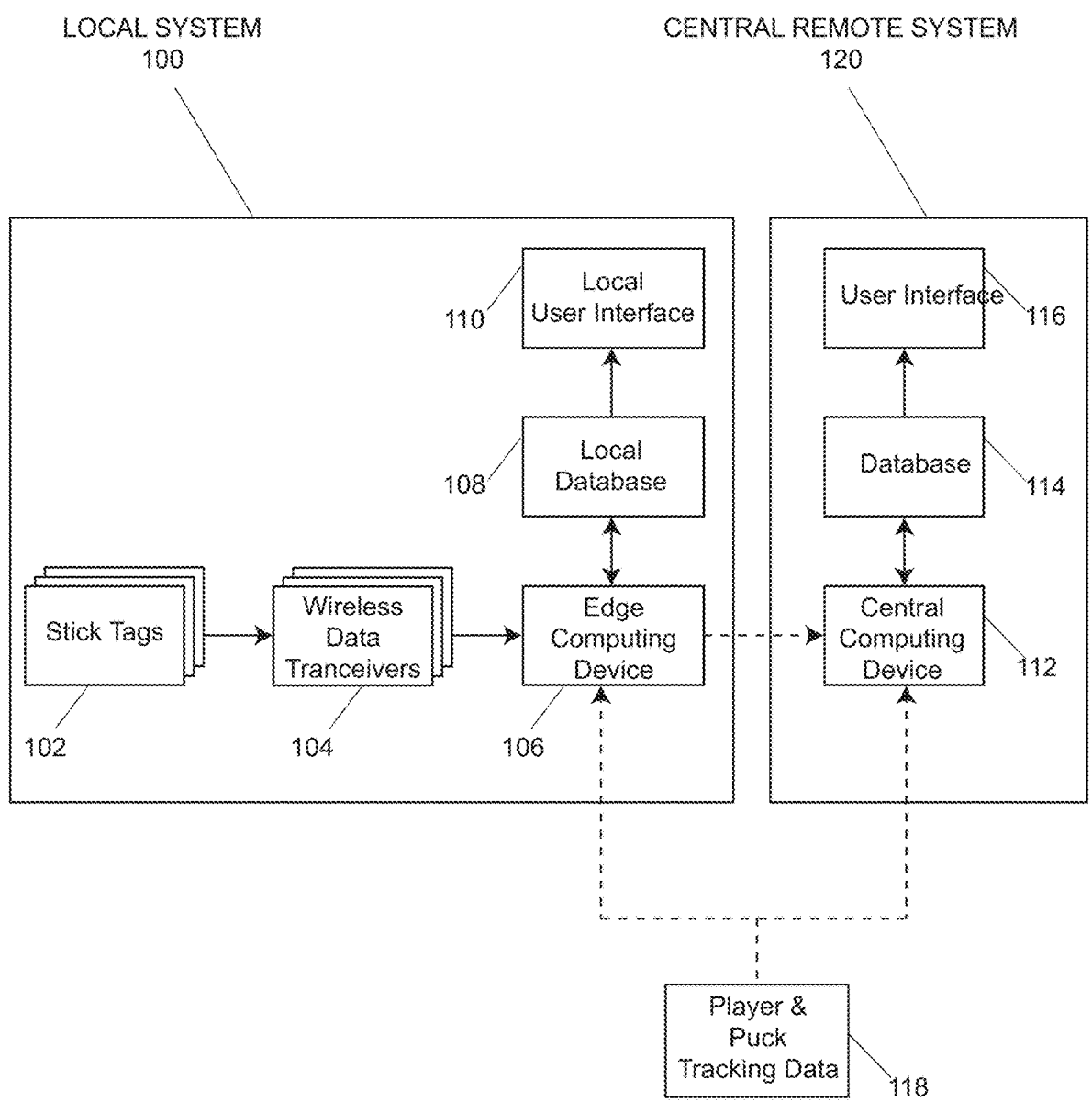
FIG. 1 is a block diagram of the system components embodying the present invention.

In general, the present invention provides a novel system and method of evaluating an athlete's skill based on their individual stick techniques used during live sporting events and in key situations. Using data removes bias from observations and provides a standardized method to measure, evaluate, benchmark and train athletes with reduced human intervention.

In accordance with a first aspect of the invention there is provided a computer-implemented method for sport monitoring comprising: capturing sensor data from sensors mounted with a stick; processing the sensor data to determine a stick orientation at each of plural times; assembling a set of the stick orientations over a time window to create an observed stick pattern; comparing the observed stick pattern to sets of stick pattern definitions stored in a database to identify that a defined sport event has occurred The method may compare the observed stick pattern for the identified sport event to a stick pattern definition in the database for that identified sport event to compute a quality metric for the identified event.

The method may store plural identified stick patterns and/or quality metrics for a player over time to evaluate a trend for the player.

The method may compare the observed stick patterns to positive and negative exemplars of stick patterns stored in the database to compute a quality metric for that defined event.

The stick sensor data may comprises at least two of: acceleration data, magnetic data, gyroscopic data, barometric data or time based location data.

The method may capture ball location data and wherein identifying the event is further based on comparing ball location data to the observed stick pattern.

The method may determine an outcome of the observed stick pattern based on the ball location data after the identified sport event.

The time window may be identified from the ball location with respect to the stick location OR based on the stick or ball location within a sports arena.

The sets of stick pattern definitions for the defined sports events may comprise values for time windows, stick acceleration, stick orientation, ball location with respect to stick location, and ball acceleration.

The sport events may correspond to one or more of: pass, shot, turnovers, deke, tipped shot, block, save, dump, chip or check attempt.

The method may compare observed stick patterns from different players or plural observed stick patterns for a single player to determine a comparison metric.

The method may synchronizing identified sport events with a video of the sport being monitored.

The method may synchronizing event attributes with a video of the sport being monitored.

In accordance with a second aspect of the invention there is provided a computer-implemented method for sport monitoring comprising: capturing sensor data from sensors mounted with a stick; determining that a sport event has occurred at a first time; processing the sensor data to determine stick orientations; assembling a set of the stick orientations over a time window near that first time to create an observed stick pattern; and comparing the observed stick pattern to one or more stick pattern definition(s) associated with sport events stored in a database to identify the event type or to compute a quality metric for the observed stick pattern.

The determining that a sport event has occurred may be based on a user inputting times of sport events.

The method may count events for each player.

The method may compare the quality metric among a cohort of players, preferably by age, gender, or team.

The method may determine a skill level of a user by comparing the observed stick pattern or collection of stick patterns to a defined skill level for defined stick patterns in the datastore.

In accordance with a third aspect of the invention there is provided a computer-implemented method for monitoring possession in a sport comprising: capturing sensor data from sensors mounted with a plurality of sticks and with a ball; processing the sensor data to determine proximity of the ball to each stick to compute first possession statistics for each stick; for each of a plurality of sticks within a contentious proximity of the ball, processing the sensor data to determine a stick orientation relative to the ball then comparing stick orientations to compute a relative probability of a given stick having possession of the ball; and computing possession statistics for each stick based on the first possession statistics and relative probabilities.

The method may comprise synchronizing possession statistics with a video of the game play.

In accordance with a fourth aspect of the invention there is provided a computer-implemented method system for monitoring a sport comprising: a plurality of stick devices having sensors and transmitters for transmitting stick sensor data, each stick device physically connected with a sports stick; a plurality of wireless data transceivers spaced around a sports arena for receiving the stick sensor data; and a central processor arranged to collect the stick sensor data from the wireless data transceivers and process the data to determine stick orientations of each stick.

The processor may be further arranged to compare a sequence of stick orientations for a given stick to classify sport events or calculate possession statistics.

The sports stick may be one of: a racquet, golf club, hockey stick, baseball bat, lacrosse stick, cricket bat, or polo mallet.

The system may comprise a ball or other sports projectile having sensors and transmitters for transmitting ball sensor data.

In accordance with a fifth aspect of the invention there is provided a computer-implemented method stick device comprising: a housing sized and shaped to physically connect to a sports stick; a power supply; a plurality of sensors for determining acceleration and orientation of the device; a processing circuit for collecting sensor measurements and operating a transceiver or transmitter device; and a transceiver to assist in determining time-of-flight location and sending kinematic and stick identifier data.

The housing may be arranged to fit into an end of the sports stick.

The plurality of sensors may comprises a 9 Degree-of-Freedom sensor.

The transceiver may be an Ultra-Wide Band transmitter.

The device in conjunction with external beacons may be produce location data using time-of-flight signal processing.

In accordance with a sixth aspect of the invention there is provided a computer-implemented system comprising: a plurality of stick devices, each having first sensors for determining acceleration and orientation of the device and a transmitter for transmitting the first sensor data; a ball with second sensors for determining acceleration of the ball and a transmitter for transmitting second data; and a plurality of wireless receiver stations for receiving first and second sensor data.

The present system provides a standardized means to quantify skill outside of tactical positioning data. These skill measurements interpret how a player can effectively protect a ball/puck during play, the best stick techniques for shooting or how a player can better defend using their stick position. These insights provide a more accurate evaluation of players and their in-game techniques and can be used to help individual players refine their stick skills by creating a baseline best technique measurement for that player type with corrective guidance.

Not only may the present invention create a baseline for an individual player's best technique and use that to refine their game play, but it may create a baseline from top player techniques, or top techniques within a specific cohort, and use that baseline to help lesser skilled players improve. The system can track the players techniques against the targeted baseline and measure their progress over time.

This system is important for youth sports where athlete development is a priority. The invention helps amateur coaches develop players better, provides players with a self-development opportunity that could otherwise not be available to them, and can provide increased motivation and satisfaction levels of athletes.

One objective of some embodiments is to increase the ability for existing sports tracking systems to accurately identify key events such as puck or ball possession, turnovers and offsides.

Another objective is to identify greater details around sports stats, such as identifying the type of shot or check rather than just the event of a shot or check itself.

Another objective is to quantify individual athlete's skill when performing key situational plays involving a stick, such as shots, passes, takeaways and defensive break-ups.

Another objective is to be able to collect stick technique data for many players during live sporting events.

DESCRIPTION OF THE PREFERRED EMBODIMENTS

The invention will now be described in detail with reference to the accompanying drawings. Provided are systems and methods of collecting detailed movements, orientation, patterns and attributes of an athletes stick itself during live games, tagging and storing that data and identifying patterns within the data to help meet the above objectives.

Although the system can be used to simultaneously track and classify the location and orientation of stick technique patterns in almost any real time sporting event, such as racquet sports (badminton, ping pong and tennis), (ball, ice, & field) hockey, lacrosse, golf, it will be described in this section with regard to one exemplary embodiment for the sport of Ice hockey. These sports use some sort of sports projectile, such as ball, puck or birdie, but for simplicity the term 'ball' is used herein to encompass all such sports projectiles.

Embodiments may comprise a stick device with specific types of sensors to accurately track the location and detailed orientation over time during a live sporting event. A network of rink antennas captures the sensor data and transfers to a computing device that processes the data and extracts patterns from the data given certain criteria. These patterns are compared against a set of stick patterns definitions in a datastore.

Embodiments further assists players in learning the best stick orientation techniques for shots, defensive plays, etc. This is done through capturing many orientations, identifying the common traits amongst the worst orientations and best orientations, presenting the benchmark to the player and identifying the players technique as compared against the benchmarks.

Embodiments can improve the accuracy of existing sports data by using the captured stick patterns to better identify a possession event and to detail the specific types of events identified, such as types of shots or takeaways.

These stick patterns are categorized to improve the accuracy and detail of existing sports data and to provide a better understanding of which techniques perform better than others.

The system may measure the location, orientation, motion and technique of an athletes stick during a live sporting event, determining notable patterns from the data collected and classifying those patterns. The resulting database of patterns provides a means to better assess a player's skill level, predict outcomes based on patterns and improve the accuracy of existing sports data analytic sets.

In the preferred embodiment FIG. 1, a central remote system 120 is used to collect and consolidate data from a plurality of local systems 100 or from a plurality of sporting event instances at the same location of the local system 100, whereby each local system 100 also includes pre-consolidated player, stick and ball tracking data 118. Some embodiments comprise the remote central system 120 ingesting both player, stick and ball tracking data 118 and data received from the local system 100 for remote consolidation, whereby other embodiments would receive a pre-consolidated form of data. In the preferred embodiment, the remote central system 120 is a centralized framework that consolidates a plurality of data from a plurality of sporting events. It may comprise a central computing component 112, which is used to receive and process data into a usable format, a database component 114 consisting of one or more databases and data stores to archive the data and handle data relationships, and a user interface 116 component that is able to access the data.

In the preferred embodiment of the local system 100, a single or plurality of stick devices 102 in use during a live sporting event transmits time and orientation data to wireless data transceivers 104 which are used to determine stick location using trilateration using any standard trilateration technique, including two-way ranging, time difference of arrival, phase difference of arrival or angle of arrival to name a few. The edge computing device 106 receives the time, location and orientation data for each stick device 102. In some embodiments, time data is not transmitted by stick devices 102 or wireless data transceivers 104, rather it is added by the edge computing device 106 as data is received. The data collected by the local edge computing device 106 is stored in a local database 108. In some embodiments, this information is streamed directly to a remote central system 120 without saving in the local database 108. Some embodiments of the local system 100 will consolidate sports tracking system data from the same event using the local edge computing device 106. Some embodiments of the local system utilize a local user interface 110 to access local data or to configure aspects of the local system 100 such as identifying the location of wireless data transceivers 104.

Figure 2:
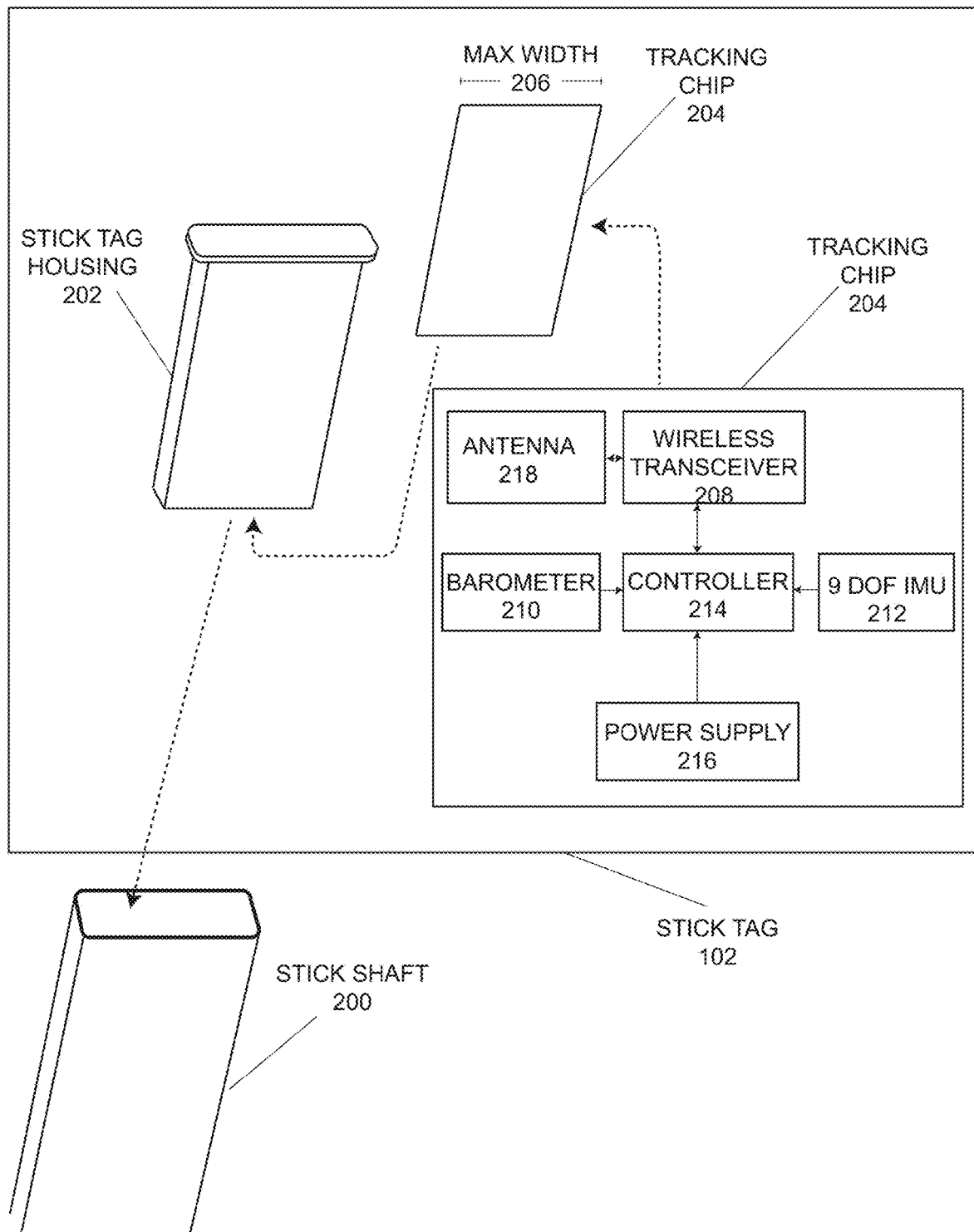
FIG. 2 is a block diagram of the electronic stick device embodying the present invention.

As FIG. 2 illustrates, in the preferred embodiment, the components of a stick device 102 which may comprise a housing 202 of negligible weight and a tracking chip 204.

One aspect of the preferred embodiment of the stick device object 102 is that the max width 206 of the tracking chip 204 is a small enough profile such that it could be inserted into a stick shaft 200 or affixed onto the butt end hollow shaft of a stick shaft 200.

One embodiment of the stick device 102 is crafting the stick device housing 202 as a replacement to the protective plugs commonly found in sticks at the end of composite or metal stick shafts 200 that protect against the sharp edges and as such, the housing 202 may be made of non-metal material such as plastic. The preferred embodiment of the stick device housing 202 is self-secured within a standard stick shaft 200 but can alternatively be held into place with sports tape or suitable adhesives. Other embodiments of the invention consist of the stick device housing 202 taking form of a cap that slides over the end of a stick. Another embodiment of the invention may comprise a tracking chip 204 that does not have a stick device housing 202 and is embedded and secured directly onto or within the stick shaft 200 itself.

In the preferred embodiment, the tracking chip 204 is equipped with a 9 degree of freedom inertial motion unit ("9DOF IMU") 212, a controller 214, wireless data transceiver 208, an antenna 218, a barometer 210 and an on-board power supply 216. The preferred embodiment of the wireless transceiver 208 utilizes an ultra-wide band chip in order to identify precise location in a sports field using trilateration to an accuracy level greater than that which typical GPS, Bluetooth or Wifi trilateration is able to accomplish. Other embodiments of the tracking chip do not include a barometer 210.

The controller 214 is used to collect information from the various sensors and distribute to the wireless transceiver 208 for broadcasting through the antenna 218. The antenna could also receive broadcast information that is passed through to the transceiver 208 and, in some embodiments, the controller 214. Some embodiments may have multiple transceivers and antennas where one is used to send or receive data and the other is used to identify device location using time-of-flight signal processing methods.

The tracking chip's 204 power supply 216 provides power and may have a plurality of power supply 216 options available, such as a rechargeable or non-rechargeable battery. The battery may be recharged by a cable attached to a charging source, such as a standard AC electrical source, universal serial bus, FireWire, ethernet or Thunderbolt wire or by inductive charging.

The stick tag (aka stick device) 102 comprises a 9DOF IMU 212 having an accelerometer, gyroscope and magnetometer to collect detailed stick orientation data of linear, rotational and compass orientation, respectively. In the preferred embodiment, a 9DOF IMU 212 is that generates standard quaternions as a data output 708, such as the BNO080 by Bosch Sensortec, is used within the stick device 102 to help identify the stick orientation 302 during different points in time and during key events. In other embodiments a 9DOF IMU could provide raw accelerometer, gyroscope and magnetometer data that is fused into quaternion data by an edge computing device 106 using a standard Madgwick filter algorithm to produce quaternion data. To create usable stick data patterns 1002, the location of the stick device 102 as determined by the local system 100 is used as the 9DOF IMU's frame of reference.

Figure 3:
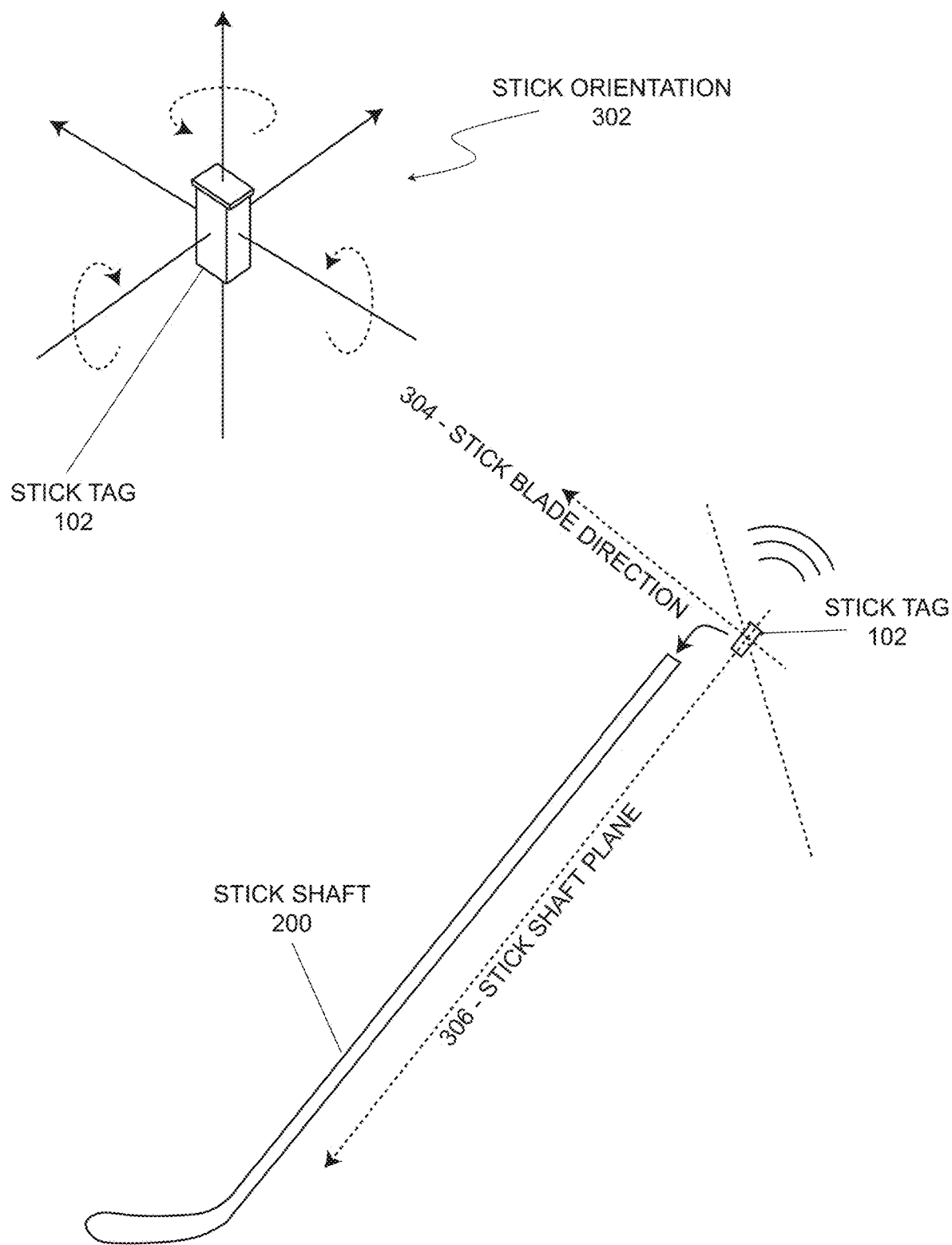
FIG. 3 is an illustration of an example of the orientation and coordinate measurements according to an embodiment of the present invention.

FIG. 3 illustrates the preferred embodiment of the present invention whereby the 9DOF IMU 212 is affixed onto the tracking chip 204 and within the stick device housing 202 in such a way that the stick orientation 302 plane of measurement is aligned along the same axis as the stick shaft 200 to produce a data measurement of the stick shaft plane 306. In some embodiments, the stick device 102 is inserted into the stick shaft 200 in a specific orientation as to identify the direction the stick blade faces 304 and in the same embodiment, a marking or means to identify the correct way to insert the stick tag housing 202 into the stick shaft 200

Although most UWB based trilateration methods can provide accurate two-dimensional location representation, three-dimensional location identification of objects near the ground is not as accurate due to wireless data transceivers 104 typically not being setup underground and possible signal reflection from the ground surface material. As such, the preferred embodiment of the tracking chip 204 includes a barometer sensor 210 to assist in determining the actual z-axis position of the stick device 102 at any given point in time. In this same embodiment, separate reference barometers in the wireless data transceivers 104 are situated at various fixed heights within the playing field as such to provide a baseline height measurement of the object. In some embodiments this can take form of a stationary location receiver 104 with a reference barometer 410 whereas other embodiments could use a stick device 204 with a barometer 210 that is set at a certain measured height as a baseline barometer height calibration measurement. In other embodiments, a barometer is not used to assist in z-axis measurement accuracy. In some embodiments, setting the wireless data transceivers at a variety of heights will provide sufficient z-axis information. In some embodiments, the z-axis location of the stick tag is not used at all.

Figure 4:
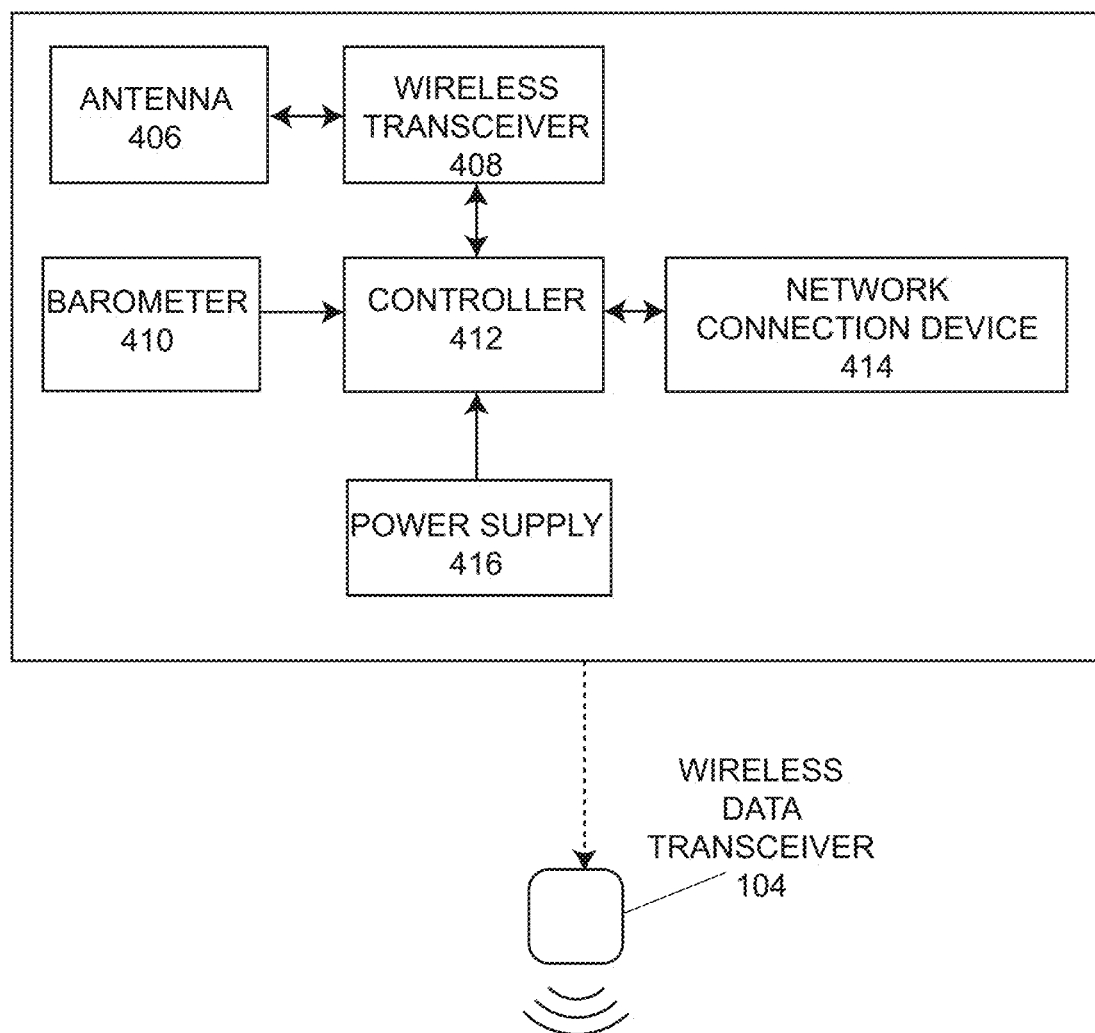
FIG. 4 is a block diagram of the wireless location transceivers embodying the present invention.

FIG. 4 is a block diagram of the preferred embodiment of the invention illustrating certain components contained within the wireless data transceivers 104. An antenna 406 is used both to send and receive signals from the tracking chip 204 or edge computing device 106 and send to the wireless transceiver 408. The signals sent between the stick devices 102 and the wireless data receivers 104 are used to determine position using a trilateration algorithm. The preferred embodiment uses identifies location using time-of-flight signal processing from ultra wide-band transmitted signal, processing distances between the stick tag 102 and a plurality of wireless data transceivers 104 using a two-way ranging method to determine distances with high accuracy and a trilateration algorithm to determine location, whereas others embodiments may use different signal processing techniques to determine distances between stick tags 102 and wireless data transceivers 104, for example one based on a time of flight computation or an angle of arrival method. Some embodiments of the wireless data transceiver may utilize a plurality of antenna 406 and wireless transceivers 408 for added functionality, for example to receive signals on a plurality of wireless networks, frequency channels, signal directions, or for using a variety of trilateration methods, or one to dedicate to signal processing and another for data transmission. The controller 412 within the wireless data transceiver is used to pass data through the various components within the system.

In some embodiments of the wireless data transceiver 104, a network connection device 414 is used to send and receive data with an edge computing device 106 and in some embodiments also to send and receive data with other wireless data transceivers 104.

This network connection device 414 can be, for example, a serial connection, wireless data connection or an ethernet connection.

The wireless data transceiver 104 has a power supply 416. In one embodiment, the power source 416 may be a battery. The power source may be built into the wireless data transceiver 104 or removable from the wireless data transceiver 104, and may be rechargeable or non-rechargeable. In an embodiment, the power supply 416 may be in form of a power-over-ethernet device or from a standard AC electrical connection where the wireless data transceiver 104 is only powered when connected. In an embodiment, the power supply 416 may be recharged by a cable attached to a charging source, such as a standard electrical plugin, universal serial bus, FireWire, ethernet or Thunderbolt wire. In another embodiment, the power supply 416 may be recharged by inductive charging, wherein an electromagnetic field is used to transfer energy from an inductive charger to the power supply 416 when the two are brought in close proximity, but need not be plugged into one another via a cable. In other embodiments, the wireless data transceiver 104 may be repowered by replacing one power source 416 with another power source 416.

Figure 5:
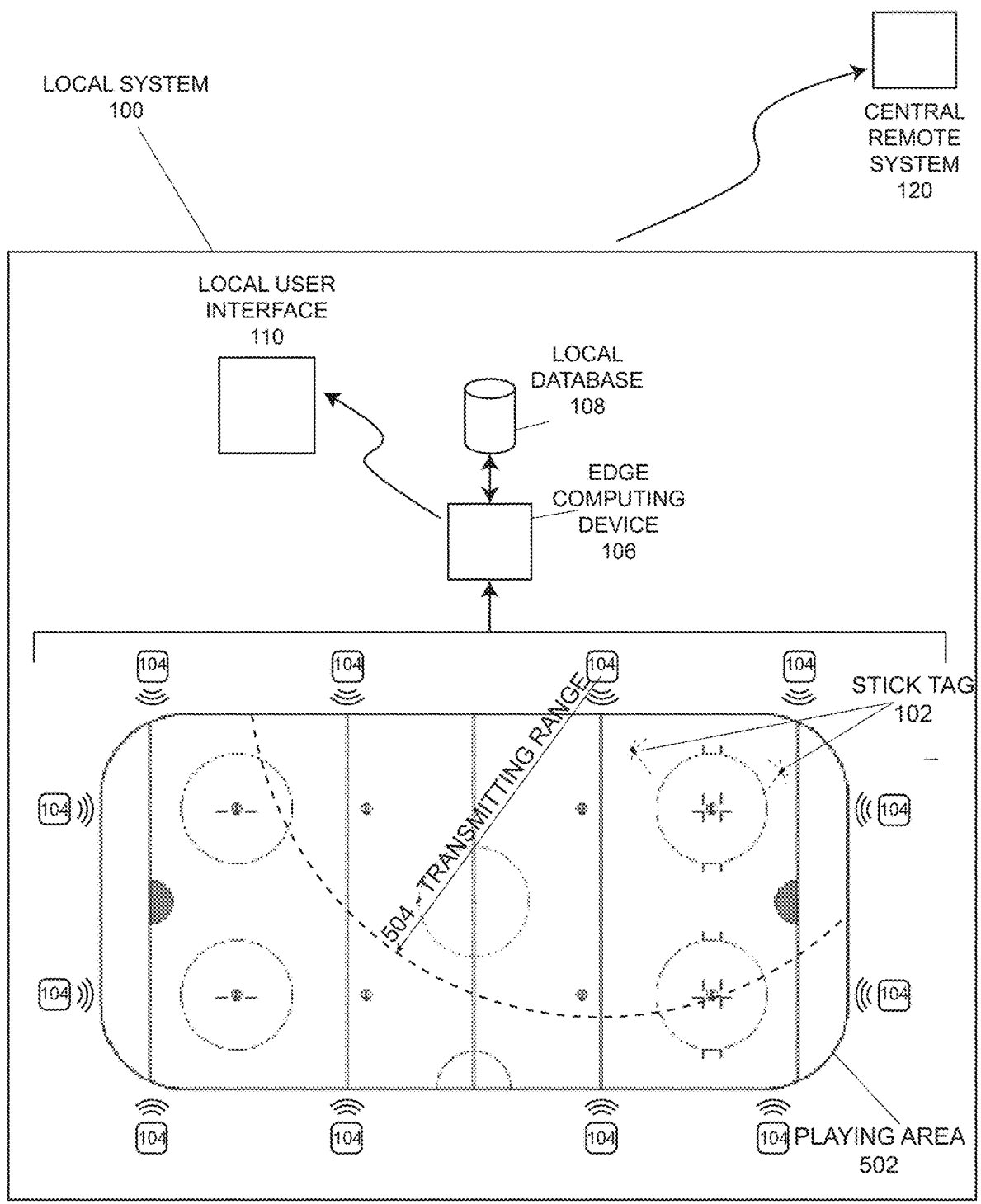
FIG. 5 is a block diagram of the wireless tracking system according to an embodiment of the present invention.

FIG. 5 illustrates an embodiment where a plurality of wireless data transceivers 104 are setup at an ice arena but other playing surfaces are contemplated. The placement of the wireless location receivers 104 is adjustable depending on the environment and user preferences as long as sufficient number (preferably three or more receivers, more preferably 10-12 receivers) are present and setup evenly spaced around the rink and at staggered heights to give Z-dimension depth where the lowest wireless location receiver 104 should be near level to the height of an athletes head and the highest wireless location receiver 104 should be no more than the distance rating of the transceiver device. that any area contained within the entire playing area 502 has coverage from the transmitting ranges 504 of at least four wireless data transceivers 104.

The system is configured to uniquely identify each individual stick device 102 in use in order to differentiate it from other stick devices 102 used simultaneously by other athletes. For example, each device may have a unique mac address or ID in its firmware, which are transmitted.

In the preferred embodiment, the edge computing device 106 collects sets of transmitted data 600 from all stick devices 102 and converts the 9DOF IMU 212 sensor data into quaternion formatted data 614 to help identify stick patterns. In some embodiments, the 9DOF IMU 212 transmitted data is converted into standard quaternion formatted data 714 by the stick device 102, wireless data transceiver 104 or central remote system 120. In other embodiments, raw sensor data from the 9DOF IMU 212 is used to determine stick patterns rather than quaternion formatted data. In other embodiments the 9DOF IMU 212 transmitted data 608 is converted into a rotation matrix and in other embodiments the 9DOF IMU 212 transmitted data 608 is converted into Euler angles.

In the preferred embodiment, FIG. 6 illustrates an example set of data 612 collected by the local system 100 which is an object of the present invention. The actual data format illustrated in FIG. 6 is figurative, and the character formatting may change in different embodiments. The preferred embodiment would identify each unique stick device 604 with a particular time 602 associated with it, three-dimensional location 606 relative to within the arena it is being tracked in, and stick orientation data 608 which identifies the stick shaft plane 306 and stick direction 304 as illustrated in FIG. 3.

Some embodiments show the stick location 606 data as only on a two-dimensional plane. Some embodiments will include additional information such as speed, direction of travel, velocity or other readings obtained from devices located on the tracking chip 204.

In certain embodiments, each stick device 102 is set to transmit a set of data 612, including the stick tag identifier 604, data timestamp 602, relative stick location in x, y, z coordinates 606 and the stick orientation 608 at a rate of between 1-10 times per second when tracking two full teams of participants, and whereas in some embodiments the data transmission rate can be set to exceed 10 times per second per stick device for greater measurement accuracy. In some embodiments where greater than 10 sets of measurement data 612 per second are transmitted and recorded, proportionately more wireless data transceivers 104 should be used to ensure the entire system's ability to handle scaled up performance applications or a higher volume of stick devices 102 being tracked at higher data transmission levels. In some embodiments, the edge computing device 106 would use proportionately additional processing power and RAM to handle the load and its disk space store a potentially larger database 114 than for the preferred embodiment, or if data is being streamed to a central remote system 120, a proportionately higher uploading speed network connection with proportionately more stable bandwidth access could be used. Alternative to a network connection, an embodiment could store all the collected data locally and later transferred to central remote system 120 for future processing or have a central system available on-site for processing.

In the preferred embodiment, the stick device's 102 rate of transmission is adjustable whereby stationary objects, such as spare sticks, are set to transmit data at a lower rate than those of sticks which are in play or near the ball. In some embodiments, an accelerometer located on the tracking chip 204 is used to trigger an increase or decrease of the stick device's 102 rate of transmitting data depending on the whether the stick device 102 is in slow motion, fast motion or still. In some embodiments, a command sent from the edge computing device 106 or the central computing device 112 can set the rate of transmission. In some embodiments, a user can initiate a data transmission rate change using a control located on the stick device 102 itself.

One embodiment of the Stick device 102 produces a synchronization timestamp 602 before being transmitted, whereas another embodiment has the wireless data transceiver 104 produce a synchronization timestamp 602, whereas another embodiment has the edge computing device 106 or central remote system 120 produce a synchronization timestamp 602 once data is received.

Figure 7:
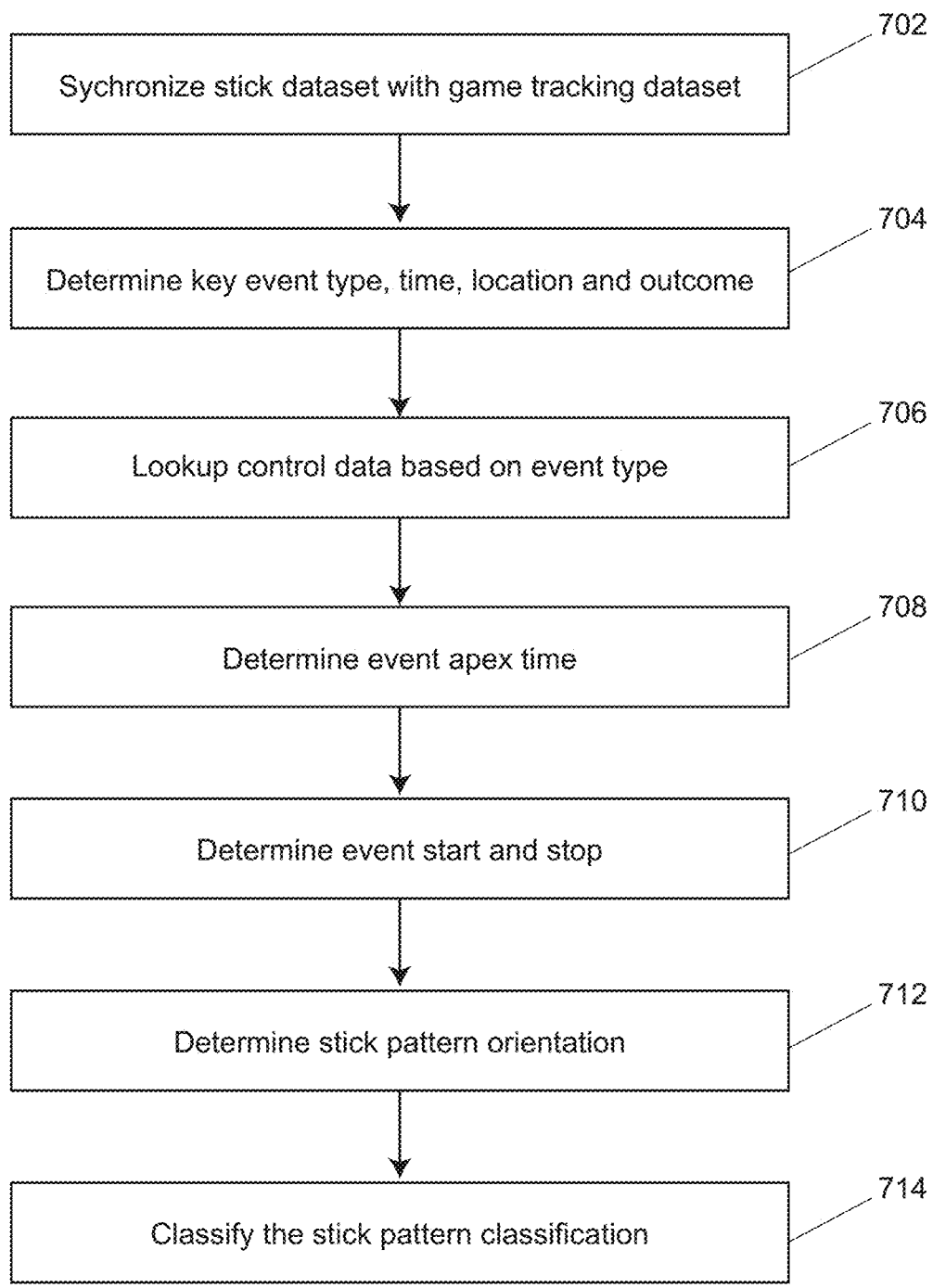
FIG. 7 is a flow diagram of the stick technique evaluation method embodying the present invention.

The processor 120 computes an observed stick pattern from the sensor data, where an observed stick pattern is a set of stick senor data identified and classified using the process in FIG. 7 and further described in FIG. 6, FIG. 8, FIG. 9 and FIG. 10.

A stick sensor data format is illustrated in FIG. 6 as a set of data 600 which represents a particular stick event that happened, such as a shot, a hit, a deke or a defensive technique etc. In an example case where a high-resolution stick pattern is classified, a hockey pass that takes 1.2 seconds to complete from beginning to end, measured at 20 times per second would result in 24 lines of data. The raw data collected 600 may not be aligned precisely to 1/20 second increments, so data cleaning steps can be taken where an algorithm to identify where the stick location 606 and orientations 608 should be at a particular standardized 1/20th second interval based on the actual captured position at the timestamps before and after. This same data cleaning technique can also be used to increase the resolution of a stick pattern that is captured at 1/10th second intervals, where the same algorithm uses known stick locations 606 and orientations 608 to determine where the stick was located and oriented at the desired timestamp 602.

FIG. 7 outlines the process to create a stick pattern. The first step 702 is to synchronize the collected stick device data 600 with player and puck tracking data 118. In order to synchronize data between two data systems, the collected stick device data 600 and existing player and puck tracking system data 118 is first aligned using a reference calibration 626. In the preferred embodiment, the timestamp values 602 & 620 from each dataset is identified and tagged to a key event, such as a start or end of play. The difference between the two timestamp values 602 & 620 can be added to the data timestamp with lesser value to create an aligned timestamp between both the collected stick device data set 600 and the existing player and puck tracking dataset 118. Another embodiment synchronizes the data sets 600 & 118 by synchronizing each of the stick device data timestamp 602 and the player and puck data timestamp 620 with the real-world time, or in another embodiment with the time clock in a computer time that is controlling both datasets, and in any of those cases uses the common value to create time data alignment 610 between the stick device data 600 and player and puck tracking data 118. In another embodiment, the stick location coordinate value 606 and the player location coordinate 624 can be used to align datasets by matching the location of a unique player 624 to that same players Stick device location 606. Another embodiment could use a human operator to mark key time marker events within the data in real-time during a live event through interaction with the edge computing device 106 that stores the key time markers in the same local database 108, of which could include starts and stops in play or the beginning and ends of periods, games or events. Another embodiment could be to use an electronic device such as a whistle detector or a video camera stream of the score clock with standard OCR or machine learning techniques to convert video images to data, and in each instance whereas key time marker events are collected in real-time and added to the local database of collected stick tag location and timing data 600.

The second step of creating a stick pattern 704 in the preferred embodiment of the present invention is to determine the key event type, time, location and outcome. In the preferred embodiment, stick device data 600 may comprise time 602 and location 606 measurements and in other embodiments, synchronized player and puck tracking data 118 has time 620 and location 624 data. In the preferred embodiment, the key event type can be determined from a defined event field 622 within existing player and puck tracking data 118. In some embodiments, the event type can be determined from a user manually tagging an event either during the event or after. In some embodiments, the event type can be determined by comparing known stick patterns from a pattern definition dataset 810 against a series of stick orientation data 608 and, for particular events such as a shot or pass, comparing against stick orientation data 608 where puck possession 622 is located 624 within the same vicinity as the stick location 606. In other embodiments, a combination of the above methods is used. In some embodiments, a plurality of outcomes of a particular event is identified and used to store as metadata 826 to provide context around a particular stick pattern. In some embodiments, outcome data is identified manually based on observation. In other embodiments, outcome is identified based on what event or series of events happened after the event in question. In other embodiments, outcome is based on analyzed sensor data, for example the velocity of the puck after the shot event.

The third step of creating a stick pattern 706 in the preferred embodiment of the present invention is to lookup definitions based on the identified event type. These definitions set standard parameters based on the event type 802 for how the apex point is defined 804, the time a stick pattern of that type typically lasts 806, and the preferred method of orientation 808 for that particular stick pattern type. Definitions of stick patterns for each type of event 802 may be entered within the database 800. In some embodiments, a time window with start and end times from apex 806 for all event types is defined. In some embodiments, a single orientation method 808 is used for all event types. In some embodiments, the time 806 definition is variable to each individual stick pattern whereby an event, location or stick orientation definition is applied as a starting and end point rather than using time-based value. In some embodiments the time 806 and orientation 808 methods are defined manually for each stick pattern. In some embodiments, combinations of the above definitions are stored.

The fourth step of creating a stick pattern 708 may be to determine the event apex 904 time. FIG. 9 illustrates one embodiment of the relationships between the event apex 904, the event start time 902 and event end time 906 for a particular stick pattern. The event apex 904 is a referenced point in a stick pattern that is considered most relevant to the event 900. For some events, the apex time 904 could be determined at the median time the stick blade and puck are identified within the same location (such as for a shot) and for other events the apex time 904 could be considered the start of an event 902 (such as a received pass) or could be considered at the end of an event 906 (such as in case of a hockey deke move). In one embodiment the start of an event 902 and end of an event 906 is determined based on position relative to the apex rather than time. The apex definition 804 is used to determine at which time-stamped entry 602 within the stick pattern data 600 the apex occurred for the particular analyzed event. In the example outlined earlier of a hockey pass, of which instance took 1.2 seconds to complete, the particular pattern could be referenced under an event type 802 called 'stationary long pass', an apex definition 804 as '{'type':'end', 'desc':'when puck possession ends'}', a time from apex 806 as '{'before':'1100','after':'300'}', and an orientation method as '{'type':'direction', 'object':'puck', 'ref':'after', 'time':'200'}' to let us know the plane is based on the direction puck moved within 200 milliseconds after the event.

The fifth step of creating a stick pattern 710 may be to identify the start time 902 and end time 906 of a particular stick pattern. These definitions are stored with the control data 800 for a particular event type 802 and may be based on the apex time 904 determined in the previous step. In some embodiments, the start and end times associated with a stick pattern is not based on time, but rather an orientation typical of the event type being identified. In these embodiments, for example, the start of a pass event could be identified as the point the stick is drawn back furthest and the end time is identified as the point in time when the stick changes direction 1004 from the natural flow of the shot or pass event. These positions and changes in direction can be determined from using the orientations of the stick tag 102 as determined by the local system 100 is used as the 9DOF IMU's frame of reference and establishing a tolerance area to identify a particular start and end stick position of an event.

The sixth step of creating a stick pattern 712 may be to take the identified subset of stick orientation data 608 and orient the data to a standard based on the event type 802 and orientation method 808 identified in the control data 800. An orientation 912 is a straight line in two-dimensions between two points that is used to match stick patterns with a common standardized plane of reference. In the preferred embodiment, the method of orientation 808 may change based on the event type being measured. FIG. 9 illustrates some examples of orientation methods. In one embodiment, an orientation method 808 used is based on the location of the player 910 during the apex time 904 relative to the puck or ball being measured during the particular event apex 916.

Another embodiment uses an orientation method 808, whereby a standard pattern orientation plane 912 is determined by identifying the resulting direction of the ball or puck after a shot event 914. Another embodiment of this similar model 910 uses the location of the event 916 and the location of the center of target 918 (net in case of a shot event, other player in case of a pass event) to determine a straight line and plane of measurement to set an orientation 912. In another embodiment, the orientation 912 can be determined by matching the stick pattern being created with known stick pattern data 810 using such attributes as apex location 904, start point 902 and end point 906 locations as determining factors to calibrate the orientation, and using a best estimate to assign an orientation based on the orientation of the known stick pattern data 810.

Another embodiment utilizes the event start point 902, apex point 904 and/or the event end point 906 to determine the stick orientation 912.

The seventh step of creating a stick pattern 714 may be to classify the stick pattern data. FIG. 8 outlines a sample embodiment of a stick device classification data set. To classify stick patterns, stick pattern definitions 810 and a stick pattern data repository 820 is used. In the preferred embodiment of the present invention, the stick pattern definitions data 810 contain classification tags 816 that help define attributes of that particular stick pattern definition 812. In another embodiment, an event type 814 attribute is used to control pattern definitions 812 of a particular type whereby classification tags 816 further describe the event sub-type and other attributes. In one embodiment, pattern definitions 812 consist of an example stick pattern with assigned tolerance values. In one embodiment, the tolerance values are assigned for the event start point 902, apex location 904 and event end point 906. In another embodiment, pattern definitions 810 are based on tolerance values set for a stick location at various defined points within the entire stick pattern. The datastore may store left- and right-handed pattern definition.

Figure 10A:
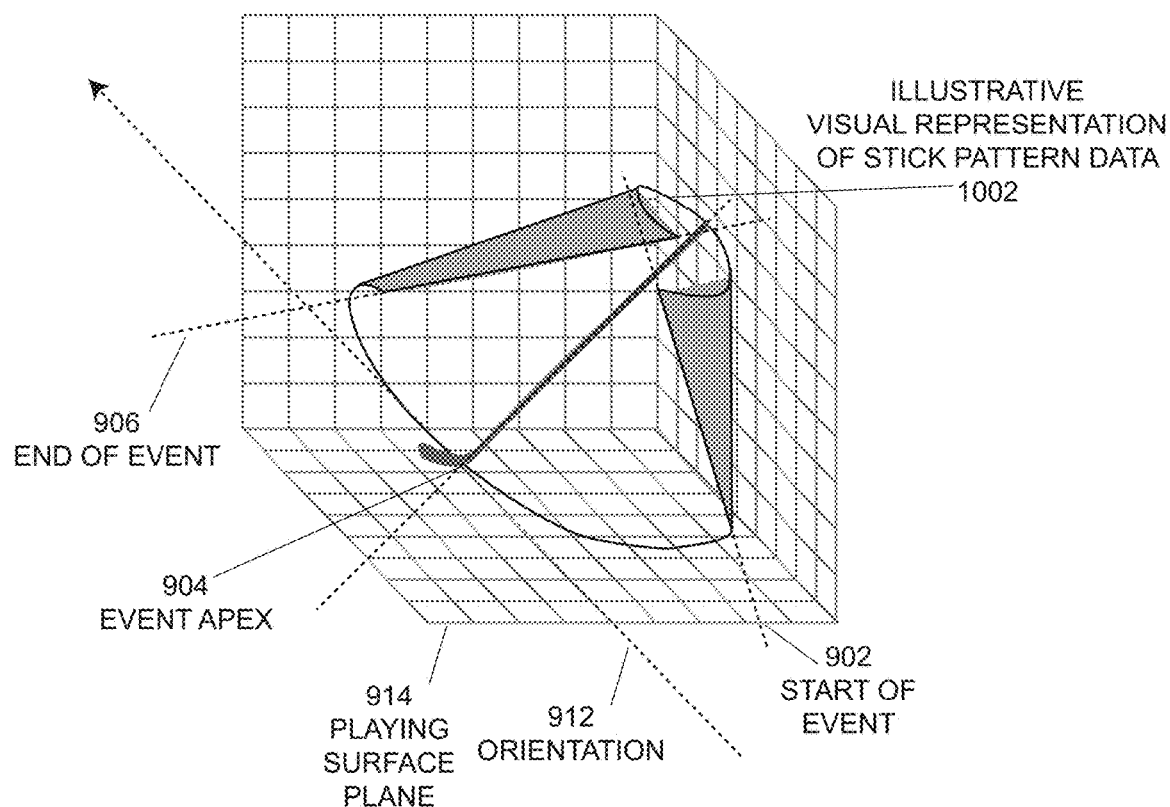
FIGS. 10A and 10B are visual representations of the identified stick technique for different coordinate frames.
Figure 10B:
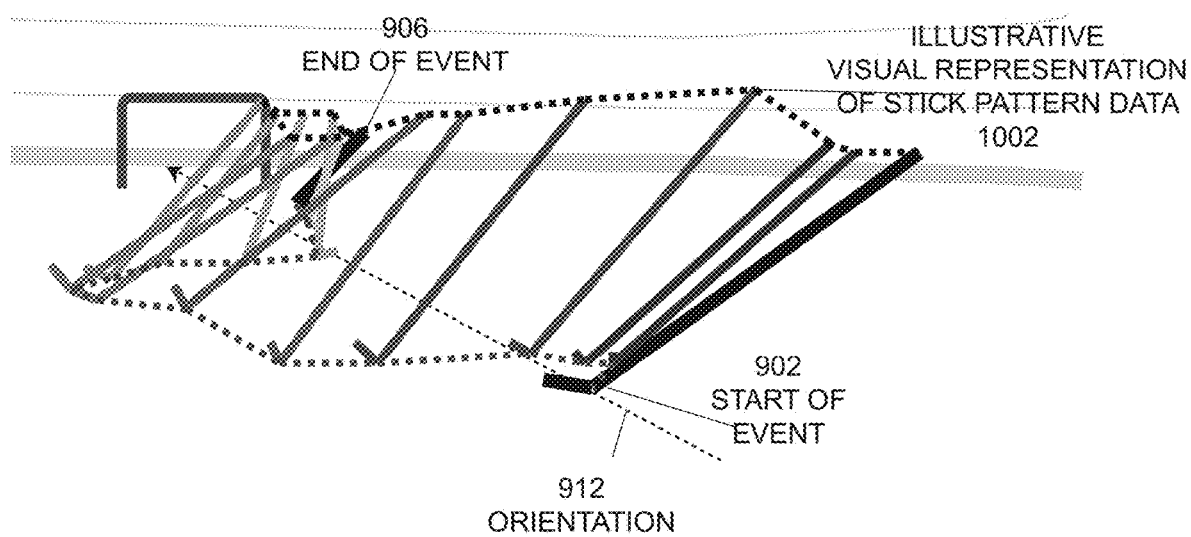

The processor may classifying the stick pattern 824 by finding the best match of the captured stick pattern data to the stick pattern definition data 812. In some embodiments this matching would be performed using algorithms running on the processor. In other embodiments, matching is done by a user manually using a UI to compare visual representations of stick pattern data 1002 as illustrated in FIG. 10 against other visual representations of defined stick patterns 810. In other embodiments, the predefined event type 618 is used to determine the stick pattern 824 event type 822.

The processor may compute one or more quality metrics for an identified event, by comparing the observed stick pattern to the event definition in the database. The processor may compute differences in stick orientation, stick acceleration, stick speed, ball speed for comparable times. The skilled person will appreciate that there are many ways to compute metrics comparing two sets of data. For example, the processor may compute the sum of squares of orientation differences plus some weighted speed of the ball. Alternative the processor may comparing the observed stick patterns to positive and negative exemplars of stick patterns stored in the database 810 to compute a quality metric for that defined event, whereby the quality metric may be that of whichever exemplar is closest or a proportionate value between the exemplars.

In preferred embodiments, stick pattern data 820 comprises the stick pattern 824, assigned descriptive classification tags, an orientation profile 808 derived from the orientation method 808 and metadata 826 to describe attributes such as player, sporting event, quality metric, outcome or other. In some embodiments the stick pattern data 820 is classified based on event types 822. In other embodiments, the event type data is one of many classification tags 828 that helps define the pattern 824.

A further outcome of identifying stick patterns, events and quality metrics is for comparisons, both among multiple players and for a single player over time, to output some statistical comparisons. The processor may compare one player against their cohort (e.g. gender, age, team, league, or country) to evaluate statistics such as fastest shot, quickest play (i.e. window of time for stick orientations to complete a defined event), most passes, longest possession time with the ball, etc.

Similarly, a trend may be evaluated for any given player for their own statistics over time, in a single sporting event or over the season. The processor may perform trend analysis and time-series analysis, as known in the art, to compute statistics such as: a baseline quality metric for identified events, rate of improvement, or plateaus. The processor may also evaluate changes in that players stick pattern over time for an event. For example, the system may output how a player's shot has sped up over time or display changes in stick orientation during that shot over time. Thus, it is possible to quantify an athlete's skill level by comparing a single athlete's single or plural stick patterns from their identified data 820 against known quality based stick patterns of the same event type 810. The processor may compute the differential between the stick pattern definition data 810 pattern and the athletes actual observed patterns to determine a skill level. The difference may be a weighted factor and/or Root-Mean-Square of differences in stick pattern attributes (orientation, speed, acceleration, etc.).

Alternatively the skill level is calculated by comparison of the athlete's observed stick pattern to the closest of plural defined stick patterns in the definition data 810, each assigned a skill level. Thus an observed stick pattern will receive skill level X when it is closest to defined pattern N, having skill level X in the database 810.

Figure 11:
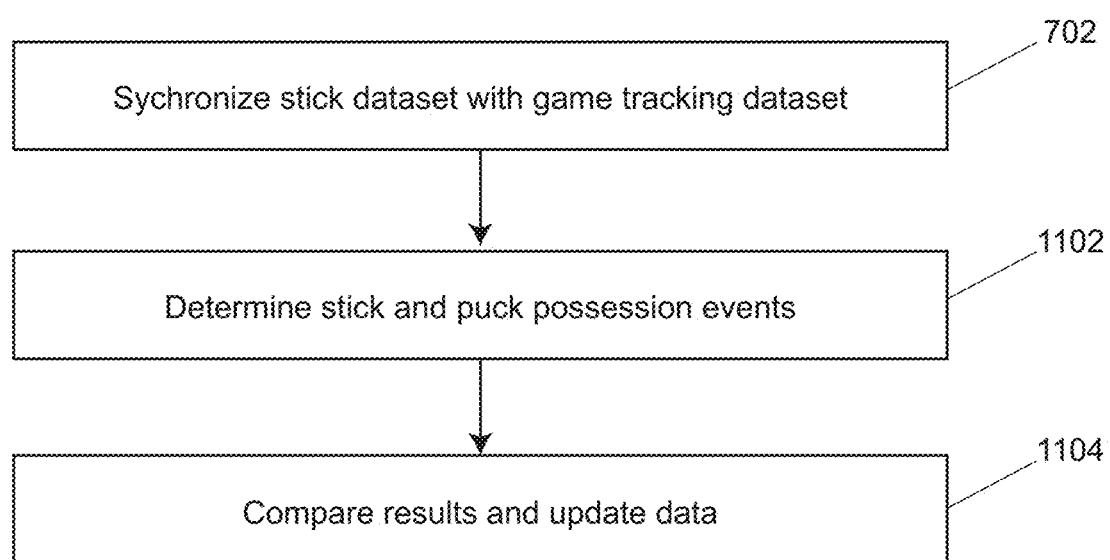
FIG. 11 is a flow diagram for determining possession statistics.

An object of the preferred embodiment of the present invention is to produce a more accurate measurement of puck possession data 622 through the process outlined in FIG. 11 and as illustrated for clarity in FIG. 12. When the present invention dataset 600 is aligned with a player and puck tracking system dataset 118 that includes ball or puck and player location 624 information, the orientation of the stick can provide a more accurate prediction of an athlete's possession 622 of the ball or puck by identifying where the stick is located relative to the ball or puck.

FIG. 12 provides a visual representation of the location of player and puck positioning data 118, which assists in assigning accurate readings for events such as shots or passes. In existing player and puck positioning data 118 that determines possession of a puck 1206 using a possession reference field 1204 based on players location 1208, 1210, puck possession values 622 can have errors. When the present stick orientation data 1216 & 1218 is overlaid onto an existing sports data collection system, player and puck location information 118, a more accurate assessment of player possession is obtained than that of which the external dataset with only player 1208, 1201 and puck 1206 data can produce. In the collected stick data, an algorithm uses the stick orientation data 608 to adjust the location of the stick device location data 606 to provide a location reference for the blade of the stick 1220. When the location of the puck 1206 and the location reference for the blade of the stick 1220 are within some distance of each other, a predicted possession event is computed that is of greater accuracy than player and puck positioning data alone.

The first step of refining possession data in the preferred embodiment of the present invention is to synchronize the collected stick device data 600 with player and puck tracking data 118 using the same method as outlined above.

The second step of refining possession data may be to determine stick and puck possession 1102. FIG. 6 helps illustrate how an algorithm can determine this using collected stick data 600 and player and puck tracking data 118. The location of the ball or puck 624 is identified along with the location of the end of a stick(s) using the stick location 606 and the stick orientation 608. A zone or radius from each object is identified to consider a suitable tolerance for ranging errors whereby the zone or radius used should be a smaller number than that used to identify the existing possession 622 value in the player and puck tracking data 118. In time-stamped entries 602,620 where time and data are aligned 610 and where the object locations are within a given radius, a more accurate possession value and higher confidence can be calculated.

The third step of refining possession data may be to compare the results of the new possession value and the existing possession value 622 from the player and puck tracking data 118. In some embodiments, where there is contention between two or more sticks proximate the ball or puck, a decision can be made by a manual operator or computer algorithm to determine which possession value to use. The stick sensor data may also be used to determine whether a given stick has possession based on stick orientation and stick acceleration with respect to the ball.

As above, a database may store orientation and stick acceleration values that typically define possession as opposed to checking attempts. These definitions may be compared to the stick data for each of the two or more contentious sticks near the ball to calculate a relative probability of which stick has possession.

The algorithm may also compare acceleration data of the ball and stick to see whether they are in phase with each other, which can indicate possession. This may be done without comparing absolute locations of stick and ball.

The invention claimed is:

1. A computer-implemented method for monitoring possession in a sporting event comprising:
   capturing player location data for a plurality of players;
   capturing stick orientation data for a plurality of sticks, each stick associated with a respective player;
   capturing projectile location data for a sports projectile;
   processing the location data to determine proximity of the sports projectile to each of the plurality of players to compute a first possession probability for each player;
   for each of the plurality of players, determine a set of contentious players that are within a contentious proximity of the sports projectile;
   for the set of contentious players, comparing respective stick orientation data to compute a relative probability of a given contentious player having possession of the sports projectile, wherein the step of computing the relative probability further comprises determining a stick end location for each stick using each player location data and respective stick orientation data, then computing proximity of each determined stick end location to the sports projectile;
   and determining which of the plurality of players has possession of the sports projectile based on their respective first possession probability and relative probabilities;
   recording the determined player having possession of the sport projectile in a datastore.

2. The method of claim 1 further comprising synchronizing the determination of possession with a video of the sporting event.

3. The method of claim 1, wherein determining which of the plurality of players has possession further comprises comparing prior and new possession determination.

4. The method of claim 1 wherein the stick is one of: a racquet, golf club, hockey stick, baseball bat, lacrosse stick, cricket bat, or polo mallet.

5. The method of claim 1 further comprising comparing a sequence of stick orientations for a given stick to calculate the possession statistics of the respective player.

6. The method of claim 1, wherein capturing projectile location data comprises (a) using sensors within the sports projectile and trilateration to determine the projectile location data and (b) transmitting the projectile location data using transmitters within the sports projectile.

7. The method of claim 1 further comprising synchronizing times of the captured player location data, stick orientation data, and projectile location data.

8. The method of claim 1 further comprising refining the possession statistics for each player by determining whether acceleration data of the sports projectile and acceleration data of the respective stick are in phase with each other.

9. The method of claim 1 wherein the contentious proximity is a suitable radius for possessing the sports projectile for a given sport.

* * * * *